US010016819B2

(12) United States Patent
McCracken (10) Patent No.: US 10,016,819 B2
(45) Date of Patent: Jul. 10, 2018

(54) METHOD AND APPARATUS FOR LOCATING AND DRILLING A HOLE IN A COMPOSITE

(71) Applicant: THE BOEING COMPANY, Chicago, IL (US)

(72) Inventor: John E. McCracken, Glen Mills, PA (US)

(73) Assignee: THE BOEING COMPANY, Chicago, IL (US)

( * ) Notice: Subject to any disclaimer, the term of this patent is extended or adjusted under 35 U.S.C. 154(b) by 627 days.

(21) Appl. No.: 14/260,675

(22) Filed: Apr. 24, 2014

(65) Prior Publication Data

US 2014/0363248 A1    Dec. 11, 2014

Related U.S. Application Data

(63) Continuation of application No. 12/571,910, filed on Oct. 1, 2009, now Pat. No. 8,741,196, which is a continuation-in-part of application No. 11/344,997, filed on Jan. 31, 2006, now abandoned.

(51) Int. Cl.
  *B23B 49/02*      (2006.01)
  *B29C 70/54*      (2006.01)

(52) U.S. Cl.
  CPC ............ *B23B 49/02* (2013.01); *B29C 70/545* (2013.01); *B23B 2215/04* (2013.01); *B23B 2222/84* (2013.01); *B23B 2226/27* (2013.01); *B23B 2260/126* (2013.01); *B23B 2260/138* (2013.01);
  (Continued)

(58) Field of Classification Search
  CPC ..... B23B 47/28; B23B 49/02; Y10T 408/567; Y10T 408/568; Y10T 408/569; Y10T 408/97; Y10T 156/1304

USPC .... 408/72 B, 115 B, 115 R, 241 B; 156/513; 264/155

See application file for complete search history.

(56) References Cited

U.S. PATENT DOCUMENTS

| | | | |
|---|---|---|---|
| 1,189,753 A | * | 7/1916 | Thue ...................... A61C 1/082 33/514 |
| 3,158,045 A | | 11/1964 | Siler |
| 3,874,808 A | | 4/1975 | Zaccardelli et al. |

(Continued)

FOREIGN PATENT DOCUMENTS

GB    2074059    10/1981

OTHER PUBLICATIONS

Parker Fluid Connectors, "Instrumentation Quick Coupling Products", Feb. 2006, Parker Hannifin Corporation, Catalog 4220/USA, pp. 15-16.

*Primary Examiner* — Eric A Gates
(74) *Attorney, Agent, or Firm* — Patterson + Sheridan, LLP (57) ABSTRACT

A body may be provided having first and second ends having threaded outer surfaces. A bore may extend between the first and second ends. A tool may be provided having a first outer mold-line surface, a second opposing surface, and a hole extending between the first and second opposing surfaces. The first end may be threadedly attached and sealed, at the second opposing surface, to an inner surface of the hole. A cap may be threadedly attached and sealed to the second end of the body. A composite may be consolidated against the first outer mold-line surface of the tool. The cap may be unthreadedly removed from the second end. A drill bit may be inserted into the bore, through the tool hole, and against the composite to drill a composite hole.

20 Claims, 12 Drawing Sheets

(52) U.S. Cl.
CPC ......... *B23B 2270/34* (2013.01); *Y10T 408/03* (2015.01); *Y10T 408/568* (2015.01)

(56) References Cited

U.S. PATENT DOCUMENTS

| | | |
|---|---|---|
| 4,696,711 A | 9/1987 | Greszczuk |
| 4,770,570 A | 9/1988 | Tsui et al. |
| 4,831,902 A * | 5/1989 | McClure ................. B25B 27/18 29/426.4 |
| 5,108,241 A * | 4/1992 | Coss ....................... B23B 47/34 408/115 B |
| 5,388,933 A * | 2/1995 | Dunbar ................. B23B 47/284 408/115 B |
| 5,630,683 A * | 5/1997 | Smith ..................... B23B 47/34 408/241 B |
| 5,649,791 A * | 7/1997 | Connolly .............. B23B 47/284 408/1 R |
| 5,820,314 A * | 10/1998 | Dunbar ................... B23B 47/28 408/115 B |
| 5,989,025 A | 11/1999 | Conley |
| 6,186,707 B1 | 2/2001 | Kain |
| 6,491,057 B1 * | 12/2002 | Collins .................. F16L 41/04 137/15.14 |
| 2006/0285931 A1 | 12/2006 | Dean |

\* cited by examiner

METHOD AND APPARATUS FOR LOCATING AND DRILLING A HOLE IN A COMPOSITE

RELATED APPLICATIONS

This application is a continuation of U.S. patent application Ser. No. 12/571,910, filed on Oct. 1, 2009, now issued as U.S. Pat. No. 8,741,196, which is a continuation-in-part of U.S. patent application Ser. No. 11/344,997, filed on Jan. 31, 2006, both of which are hereby incorporated by reference.

STATEMENT OF GOVERNMENT SUPPORT

This invention was made with Government support under contract N00019-05-0002 awarded by the United States Navy. The Government has certain rights in this invention.

FIELD OF THE DISCLOSURE

The field of the disclosure relates to apparatus and methods for drilling at least one hole in at least one composite.

BACKGROUND OF THE DISCLOSURE

Tools are often used to manufacture composites. The tools typically comprise a first surface in a pre-determined shape. During heating of the composite, the first surface of the tool often abuts against the composite in order to dictate the shape of the manufactured composite. After the curing process, it is often necessary to locate and/or drill holes in one or more locations of the manufactured composite. However, many of the existing apparatus and methods, which are designed to aid in locating and/or drilling holes in manufactured composites, may provide less than desired performance which may make hole location and/or drilling more difficult. These may include one or more of the following performance areas such as: cost; accuracy; efficiency; contaminants interfering with the process; complexity and number of parts of the required equipment; repeatability; time of manufacture; and/or breakdown in equipment. An apparatus and method is needed which may solve one or more issues in locating and/or drilling holes in a composite part.

SUMMARY OF THE DISCLOSURE

In one embodiment, a method for drilling at least one hole in at least one composite is disclosed. A body may be provided. The body may comprise first and second ends each having a threaded outer surface. A bore may extend from the first end through the second end. A tool may be provided. The tool may comprise a first outer mold-line surface for defining a shape of a composite, a second opposing surface, and a hole extending from the first outer mold-line surface through the second opposing surface. The first end of the body may be threadedly attached and sealed, at the second opposing surface, to an inner surface of the hole of the tool. A cap may be threadedly attached and sealed to the second end of the body. A composite may be consolidated against the first outer mold-line surface of the tool. The cap may be removed from the second end of the body by unthreading the cap from the second end. A drill bit may be inserted into the bore of the body, through the hole of the tool, and against the composite. A hole may be drilled in the composite.

In another embodiment, a method for drilling at least one hole in at least one composite is disclosed. A one-piece body is provided. The one-piece body may comprise first and second ends each having a threaded outer surface, a bore extending from the first end through the second end, and a ledge extending outwardly between the first and second ends. A tool may be provided. The tool may comprise a first outer mold-line surface for defining a shape of a composite, a second opposing surface, and a hole extending from the first outer mold-line surface through the second opposing surface. At least one of a sealing compound and a sealing tape may be disposed against at least one of the threaded outer surface of the first end of the one-piece body and an inner surface of the hole. The first end of the one-piece body may be threadedly attached to the inner surface of the hole of the tool by rotating the ledge, using a rotating tool, so that the ledge is at least one of disposed over and abutted against the second opposing surface with the first end of the one-piece body hermetically sealed to the inner surface of the hole of the tool. A cap may be threadedly attached to the second end of the one-piece body. The cap may be hermetically sealed to the second end as a result of at least one of a seal and an o-ring being disposed in the cap. A composite may be laid up against the first outer mold-line surface of the tool. The composite may be heated while applying vacuum pressure to press the composite against the first outer mold-line surface of the tool while maintaining the hermetic seals. The cap may be removed from the second end of the one-piece body by unthreading the cap from the second end. A drill bit may be inserted into the bore of the one-piece body, through the hole of the tool, and against the composite. A hole may be drilled in the composite.

In an additional embodiment, a method for drilling at least one hole in at least one composite is disclosed. A one-piece body may be provided. The one-piece body may comprise first and second ends each having a threaded outer surface, a bore extending from the first end through the second end, and a ledge extending outwardly between the first and second ends. The threaded outer surface of the first end may comprise a National Pipe Thread tapered thread, and the threaded outer surface of the second end may comprise a United National Fine non-tapered thread. A tool may be provided. The tool may comprise a first outer mold-line surface for defining a shape of a composite, a second opposing surface, and a hole extending from the first outer mold-line surface through the second opposing surface. At least one of a sealing compound and a sealing tape may be disposed against at least one of the threaded outer surface of the first end of the one-piece body and an inner surface of the hole. The first end of the one-piece body may be threadedly attached to the inner surface of the hole of the tool by rotating the ledge, using a rotating tool, so that the ledge is at least one of disposed over and abutted against the second opposing surface. The first end of the one-piece body may be hermetically sealed to the inner surface of the hole of the tool. A cap may be threadedly attached to the second end of the one-piece body. The cap may be hermetically sealed to the second end as a result of at least one of a seal and an o-ring being disposed in the cap. A composite may be laid up against the first outer mold-line surface of the tool. The composite may be heated under vacuum and pressure while maintaining the hermetic seals. The cap may be removed from the second end of the one-piece body by unthreading the cap from the second end. A drill bit may be inserted into the bore of the one-piece body, through the hole of the tool, and against the composite. A hole may be drilled in the composite. The composite may be removed from the first outer mold-line surface of the tool after drilling the hole in the composite. The cap may be threadedly reattached to the second end of the one-piece body. The cap may be hermetically resealed to the second end as a result of the at least one seal and o-ring being disposed in the cap. Steps of the method may be repeated to drill additional holes in other composites.

One or more embodiments of the disclosure may reduce one or more issues of one or more of the conventional apparatus and methods for drilling at least one hole in at least one composite. For instance, one or more embodiments of the disclosure may aid in locating and/or drilling holes in one or more composite parts, may prevent contaminants from interfering with the manufacturing process, may reduce cost, may improve accuracy, may improve efficiency, may reduce required equipment, may increase repeatability, may reduce time of manufacture, and/or may reduce breakdown in equipment. In such manner, the present disclosure may aid in manufacturing composite parts in both airplane and non-airplane applications.

These and other features, aspects and advantages of the disclosure will become better understood with reference to the following drawings, description and claims.

DETAILED DESCRIPTION OF THE DISCLOSURE

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

The apparatus and methods of the disclosure may be used to locate and drill one or more holes in one or more composites. These apparatus and methods may be used to locate holes to be drilled in one or more post-cure composites after they have been formed on a surface of a tool during a curing process and fully cured. The apparatus and methods may be utilized to locate and drill holes in parts of an airplane or in non-airplane applications. The apparatus and methods may be used to index (i.e. locate) holes and/or completely drill the holes from the back-side of the composite in areas of the composite which may be hard to reach from the front-side of the composite after the composite is removed from the tool and installed. This may allow for the precise drilling of holes in the composite. Moreover, this may alleviate the difficulty in locating holes in the composite after the composite is removed from the tool. Furthermore, back-drilling of the composite may prevent material of the composite from clogging the holes during the process.

Figure 1:
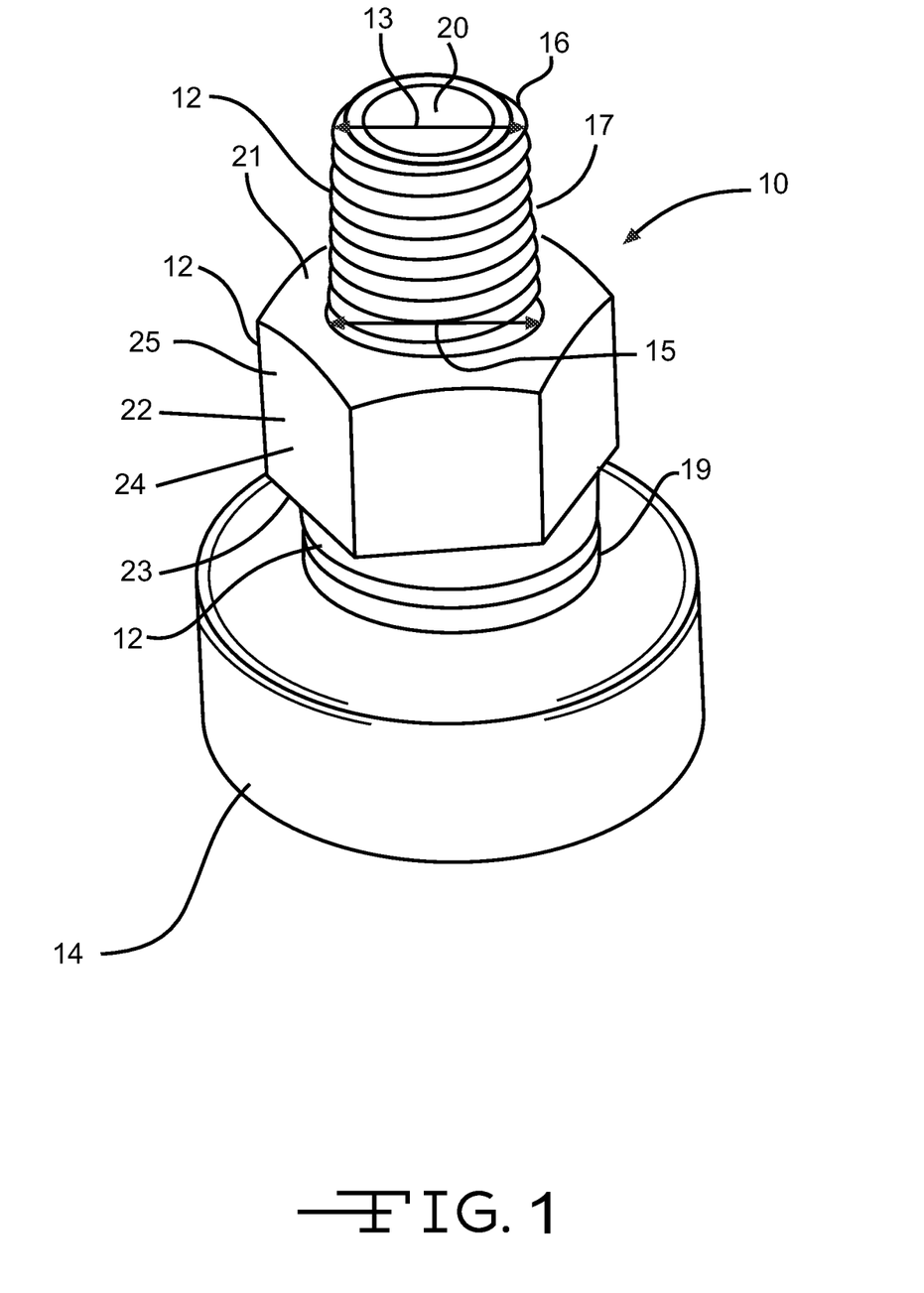
FIG. 1 is an illustration of a perspective view of one embodiment of an assembled apparatus under the disclosure.
Figure 2:
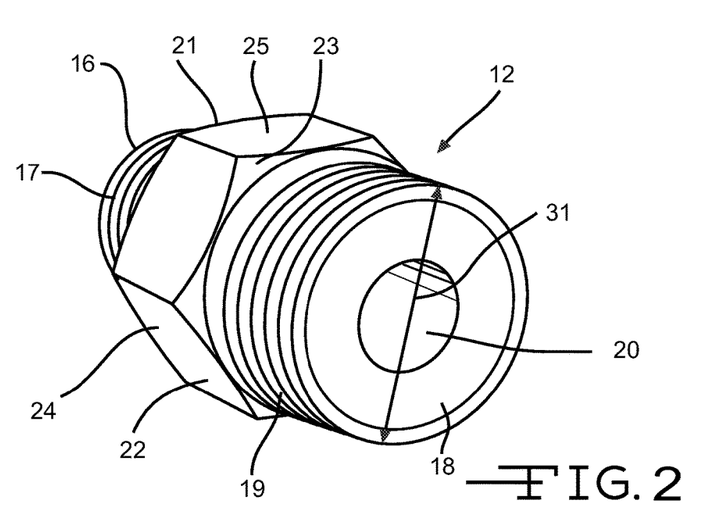
FIG. 2 is an illustration of a perspective view of a body of the apparatus of FIG. 1 with a cap of the apparatus disassembled.

FIG. 1 shows a perspective view of one embodiment of an assembled apparatus 10 under the disclosure. As shown, the apparatus 10 may comprise a body 12 and a cap 14. The body 12 may be one-piece. FIG. 2 shows a perspective view of the body 12 with the cap 14 disassembled from the body 12. The body 12 may comprise first and second ends 16 and 18. The body 12 may be made of steel. In other embodiments, the body 12 may be made of varying materials which have similar or equal coefficients of thermal expansion as the tool 42 (see FIG. 6) the body 12 is to be used in conjunction with. Preferably, the body 12 has substantially the same coefficient of thermal expansion as the tool 42 (see FIG. 6) it is adapted to be used with. A bore 20 may extend through a cross-section of the body 12 from the first end 16 through the second end 18. The body 12 and/or bore 20 may be annular or, in other embodiments, may comprise varying shapes, sizes, configurations, and orientations. A ledge 22 may be disposed between the first and second ends 16 and 18.

Outer surfaces 17 and 19 of the first and second ends 16 and 18 of the body 12 may be threaded with male threads. As best shown in FIG. 1, outer surface 17 of the first end 16 of the body 12 may comprise a National Pipe Thread tapered thread which tapers outwardly from a smallest diameter 13 at the first end 16 to a largest diameter 15 at and/or near the ledge 22. As best shown in FIG. 2, outer surface 19 of the second end 18 of the body 12 may comprise a United National Fine non-tapered thread which comprises a same diameter 31 uniformly throughout the outer surface 19. FIG. 2 also depicts the outer surface 17 of the first end 16 of the body tapering from the first end 16 to the ledge 22, but the taper of the outer surface 17 is more easily viewed in FIG. 1.

As shown in FIG. 2, the ledge 22 of the body 12 may be disposed at a mid-section 24 of the body 12. The ledge 22 may extend outwardly from the body 12 beyond the outer surfaces 17 and 19 of the first and second ends 16 and 18. The ledge 22 may comprise a bottom surface 21, a top surface 23, and a side-surface 25. The bottom surface 21 and/or the top surface 23 of the ledge 22 may be substantially perpendicular to one or more of the first and second ends 16 and 18 of the body 12. The side-surface 25 may be hexagonally-shaped.

Figure 3:
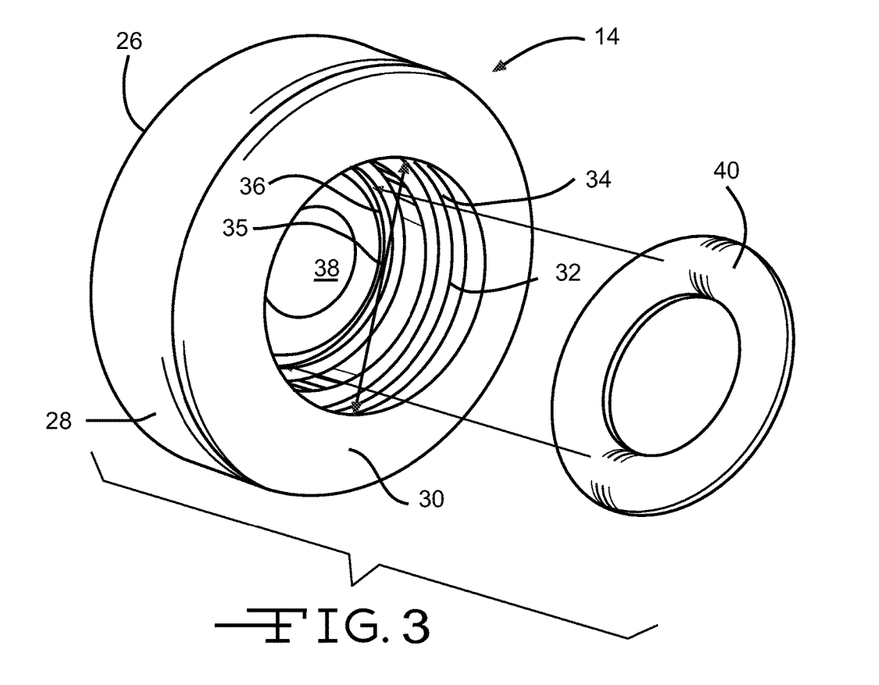
FIG. 3 is an illustration of a perspective view of the cap of FIG. 1 with the body disassembled from the cap.

FIG. 3 shows a perspective view of the cap 14 with the body 12 disassembled from the cap 14. The cap 14 may comprise a top closed-off outer surface 26, a substantially annular outer surface 28 extending substantially perpendicularly from the top closed-off outer surface 26, and a bottom outer surface 30 defined by a hole 32. An inner surface 34 within the hole 32 of the cap 14 may be threaded with female threads, may extend around the inner circumference of the cap 14, and may be adapted to threadedly attach the cap 14 to the second end 18 of the body 12 by interacting with and/or receiving the threads of the outer surface 19 of the second end 18 of the body 12. The threads of the inner surface 34 may comprise a United National Fine non-tapered thread having a same diameter 35 throughout the inner surface 34. A groove 36 may extend around a top inner surface 38 of the cap 14. An O-ring seal 40 may be disposed within the groove 36 and may extend around the top inner surface 38 of the cap 14. The cap 14 may be adapted to be hermetically sealed to the second end 18 of the body 12 using the o-ring seal 40 and/or another type of seal. The cap 14 may be made of steel, but in other embodiments may be made of any material known in the art. In still other embodiments, the cap 14 may comprise varying shapes, sizes, configurations, and orientations.

Figure 4:
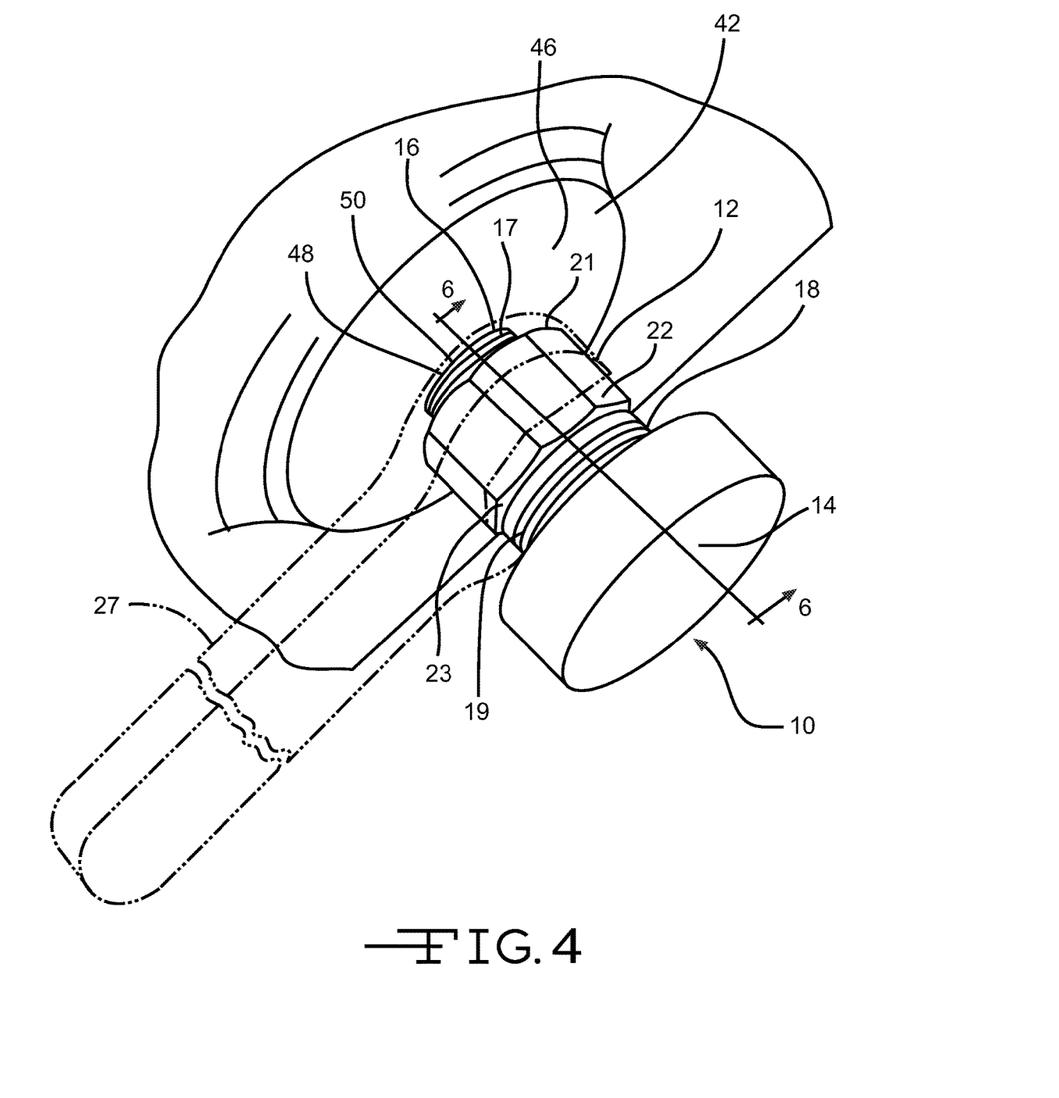
FIG. 4 is an illustration of a partial perspective view of the apparatus of FIG. 1 with the body attached to a tool.
Figure 5:
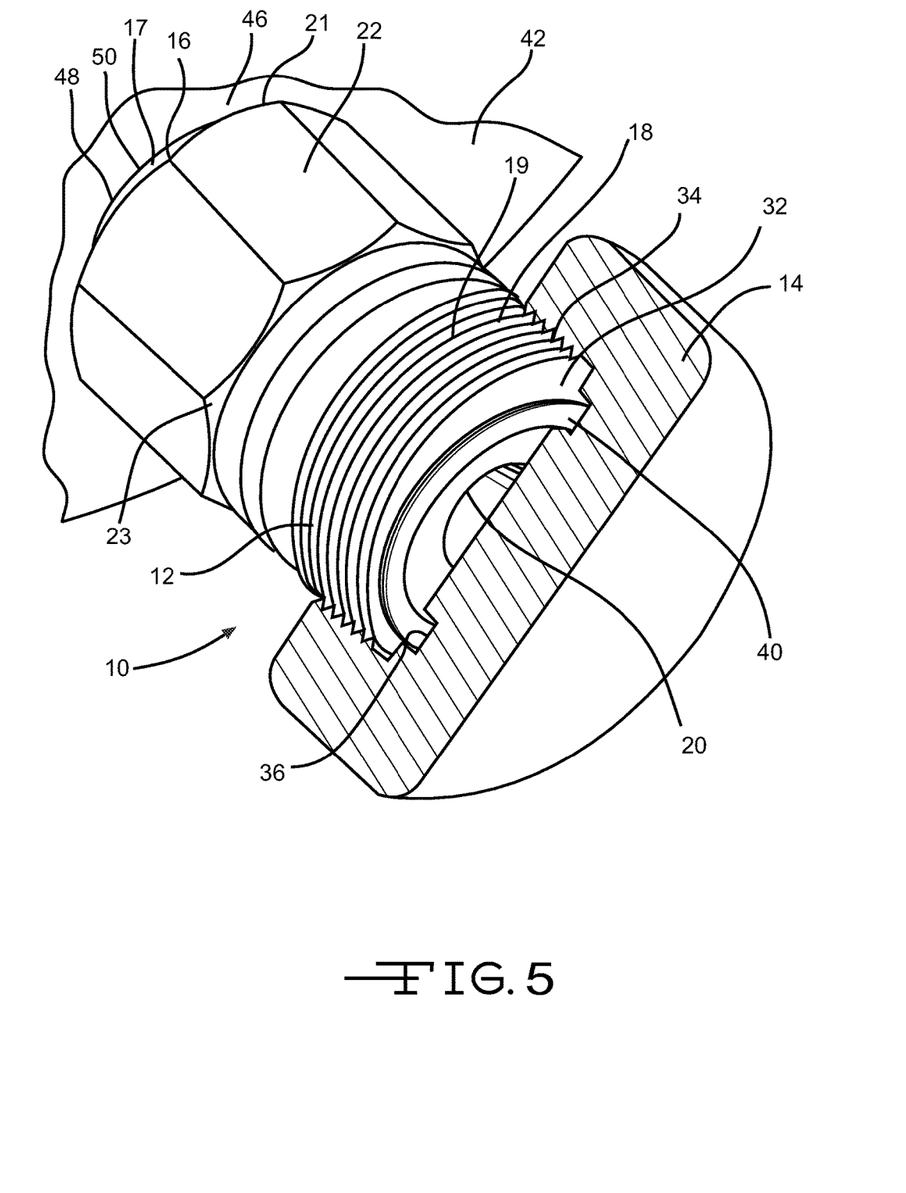
FIG. 5 is an illustration of a partial cut-away view of FIG. 4 showing the cap partially cut-away to show the attachment of the cap to the body.
Figure 6:
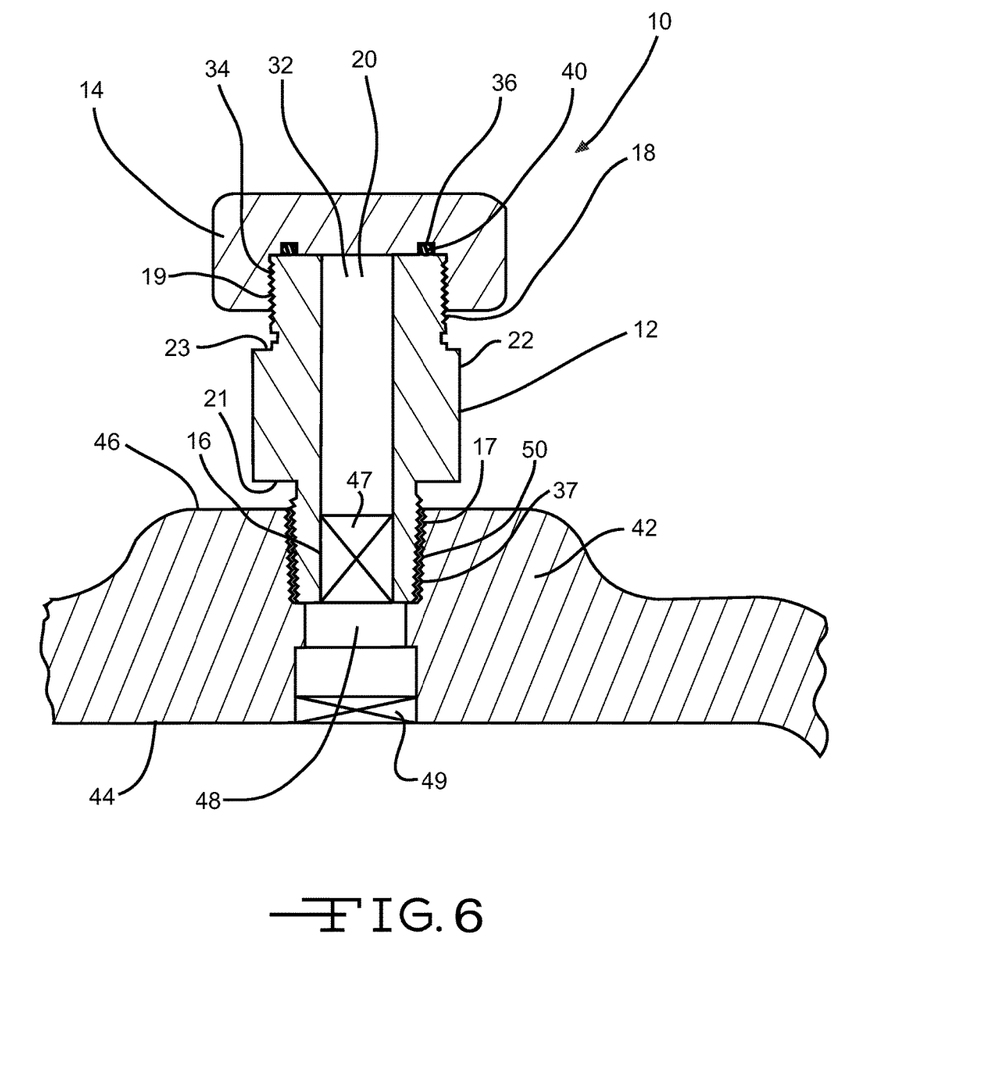
FIG. 6 is an illustration of a partial cut-away view along line 6-6 of FIG. 4 showing a partial cross-sectional view through the tool and apparatus.

FIG. 4-6 show various views of the apparatus 10 of FIG. 1 attached to a tool 42. For instance, FIG. 4 shows a partial perspective view of the apparatus 10 of FIG. 1 attached to the tool 42 with the cap 14 attached to the second end 18 of the body 12. FIG. 5 shows a partial cut-away view of FIG. 4 showing the cap 14 partially cut-away to show the attachment of the cap 14 to the second end 18 of the body 12. FIG. 6 shows a partial cut-away view along line 6-6 of FIG. 4 to show a partial cross-sectional view through the tool 42 and apparatus 10.

As shown in FIGS. 4-6, the tool 42 may comprise a first outer mold-line surface 44 configured to shape a composite placed against the first outer mold-line surface 44 in a shape of the first outer mold-line surface 44, a second opposing surface 46, and a hole 48 extending from the first outer mold-line surface 44 to the second opposing surface 46. The hole 48 may be defined by a threaded inner surface 50 having female threads which may extend through only a portion of the hole 48, or through the entire hole 48. The hole 48 may be in a variety of shapes, sizes, orientations, and configurations.

Outer surface 17 of the first end 16 of the body 12 may be threadedly attached to the inner surface 50 of the hole 48 of the tool 42 with the bottom surface 21 of the ledge 22 disposed near and/or against the second opposing surface 46 of the tool 42. The second opposing surface 46 of the tool 42 may comprise a back-side of the tool 42. By attaching the first end 16 of the body 12 to the second opposing surface 46 of the tool 42, the body 12 is kept apart from the first outer mold-line surface 44 of the tool 42 having the mold-line which shapes the composite 51 (shown in FIG. 7). This avoids interference of the body 12 with the composite 51, avoids the necessity of additional tooling which would be required if the body 12 were attached to the first outer mold-line surface 44 of the tool 42, and thereby saves cost during manufacturing. The outer surface 17 may have been threadedly attached to the inner surface 50 of the hole 48 of the tool 42 by a rotating tool 27 having rotated the ledge 22 of the body 12. The rotating tool 27 may comprise a wrench. As shown in FIG. 6, a sealing material 37 may be disposed between the female threaded inner surface 50 of the hole 48 of the tool 42 and the male threaded outer surface 17 of the first end 16 of the body 12. The sealing material 37 may comprise at least one of a sealing compound and sealing tape. If the sealing material 37 comprises sealing tape, the sealing material 37 may be applied to the male threaded outer surface 17 of the first end 16 of the body 12 prior to threadedly attaching the male threaded outer surface 17 of the first end 16 of the body 12 to the female threaded inner surface 50 of the hole 48 of the tool 42. If the sealing material 37 comprises a sealing compound, the sealing material 37 may be applied to one of or both of the male threaded outer surface 17 of the first end 16 of the body 12 and/or to the female threaded inner surface 50 of the hole 48 of the tool 42, prior to threadedly attaching the male threaded outer surface 17 of the first end 16 of the body 12 to the female threaded inner surface 50 of the hole 48 of the tool 42. The use of the sealing material 37 in conjunction with the outer surface 17, comprising the National Pipe Thread tapered thread, will hermetically seal the hole 48 of the tool 42 to prevent contaminants from entering the hole 48 between the outer surface 17 of the body 12 and the inner surface 50 of the hole 48 of the tool 42. This hermetic seal helps avoid contaminants from contaminating the composite 51 (shown in FIG. 7) laid up on the first outer mold-line surface 44 (shown in FIG. 7) of the tool 42 (shown in FIG. 7). The ledge 22 may be disposed near and/or against the second opposing surface 46 of the tool 42. The ledge 22, if abutted against the tool 42, may stabilize the body 12 against the tool 42.

Outer surface 19 of the second end 18 of the body 12 may be threadedly attached to the inner surface 34 of the cap 14. The cap 14 may be hermetically sealed to the outer surface 19 of the second end 18 of the body 12 due to the use of the o-ring seal 40 and/or another type of seal. In such manner, contaminants may be prevented from entering the hole 48 of the tool 42 through the bore 20 of the body 12. A bushing 47 may be disposed within the bore 20 of the body 12. In other embodiments, a bushing 47 may be disposed at location 49 within the hole 48 of the tool 42.

Figure 7:
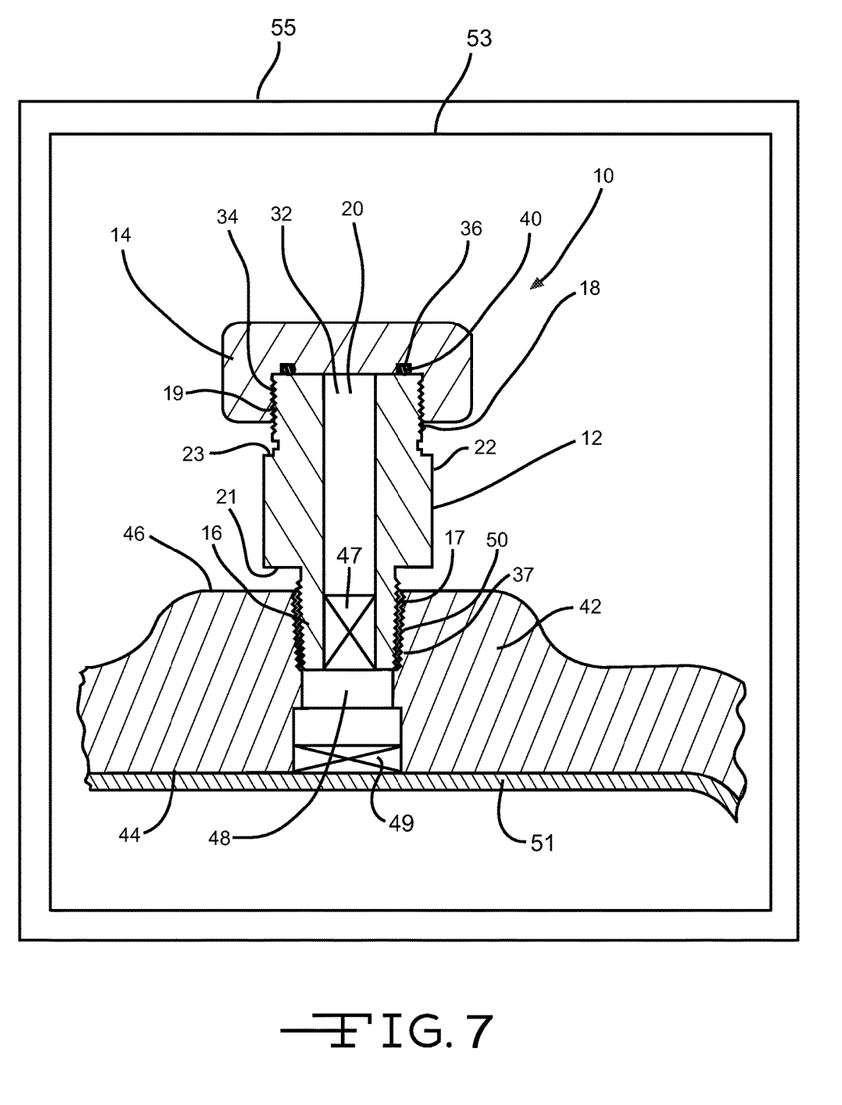
FIG. 7 is an illustration of the view of FIG. 6 with a composite having been laid up against the tool, and the composite and tool having been placed in a vacuum bag and heating device.

FIG. 7 shows the view of FIG. 6 with a composite 51 having been laid up against the first outer mold-line surface 44 of the tool 42, and the composite 51 and tool 42 having been placed in a vacuum bag 53 and heating device 55 to cure the composite 51. The process of laying up, heating, and curing the composite 51 against the first outer-mold-line surface 44 of the tool 42 is defined as consolidating the composite 51. The vacuum bag 53 may apply vacuum pressure to apply pressure against the composite 51 towards the first outer mold-line surface 44 of the tool 42. The heating device 55, such as a heating oven or other type of heating device, may apply heat to heat the composite 51 while the vacuum pressure is being applied. The hermetic sealing of the cap 14 to the body 12, and the hermetic sealing of the body 12 to the tool 42 is critical to avoid vacuum leakage through the hole 48 of the tool 42 and through the bore 20 of the body 12 in order to keep vacuum pressure against the composite 51. In such manner, the composite 51 will be pressed against the tool 42 without vacuum leakage to allow the formation of a good composite part. Without the hermetic sealing, vacuum pressure would leak leading to less than desired formation of the composite part. The first outer mold-line surface 44 of the tool 42 may shape a surface of the composite 51 according to a mold-line of the first outer mold-line surface 44. During this process, the first and second ends 16 and 18 of the body 12 remain hermetically sealed to the respective inner surface 50 of the hole 48 of the tool 42 and to the cap 14 in order to prevent contaminants from entering the hole 48 of the tool 42 and to provide consistent vacuum pressure pressing the composite 51 against the tool 42.

Figure 8:
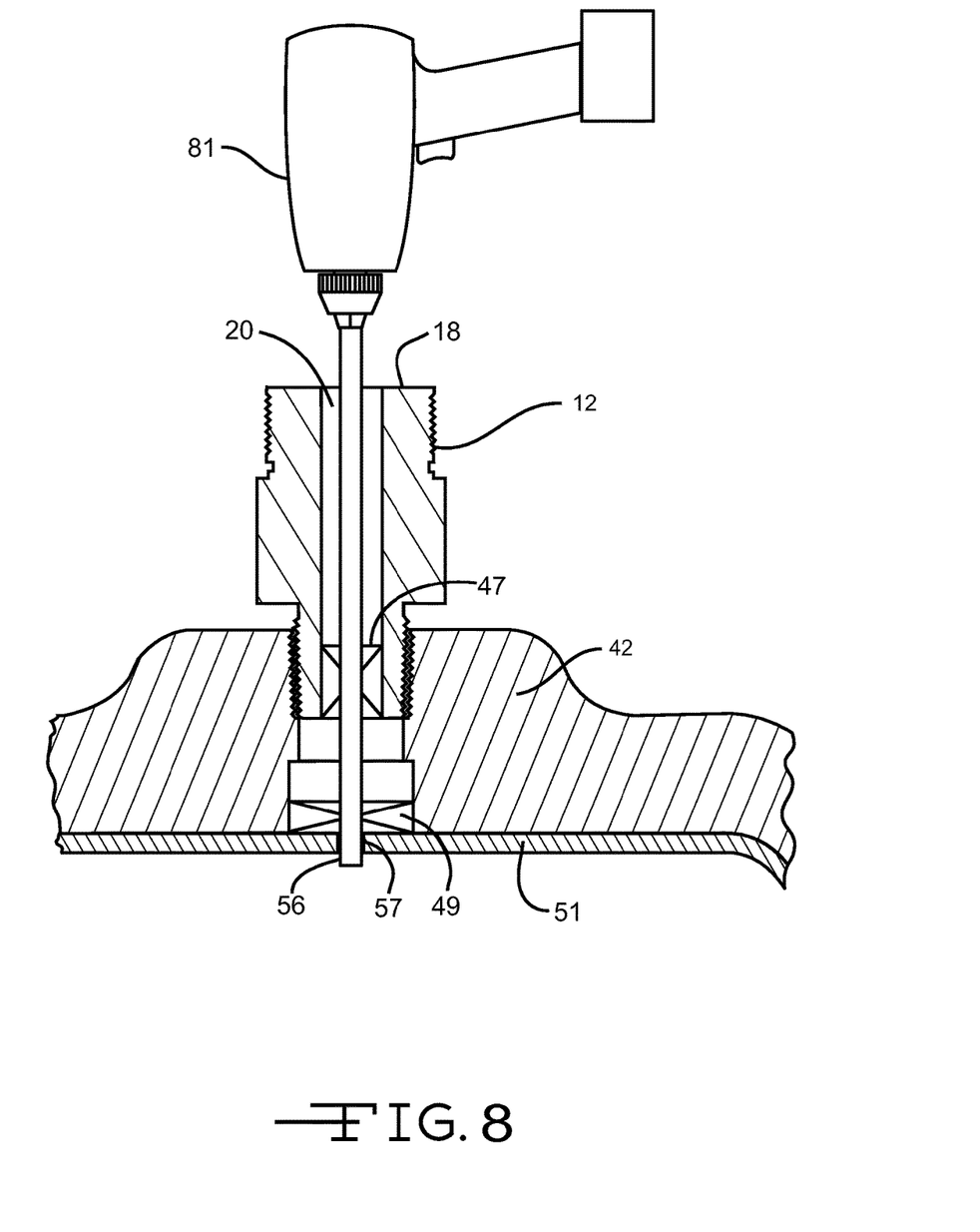
FIG. 8 is an illustration of the view of FIG. 7 with the composite and tool having been removed from the vacuum bag and heating device, the cap having been removed from the body, and a drill bit having drilled a hole in the composite through a bore of the body.

FIG. 8 shows the view of FIG. 7 with the tool 42 and composite 51 having been removed from the vacuum bag 53 and heating device 55, the cap 14 having been threadedly removed from the second end 18 of the body 12, and a drill bit 56 of a drill 81 having been used to drill a hole 57 in the composite 51 through the bore 20 of the body 12 at the back-side (i.e. second opposing surface 46) of the tool 42. This process is referred to as back-drilling because the drill-bit 56 is inserted at the back-side (i.e. second opposing surface 46) of the tool 42 in order to drill the hole 57 in the composite 51 from the back-side of the tool 42. The bushing 47 may assist in keeping the drill bit 56 in the desired location.

Figure 9:
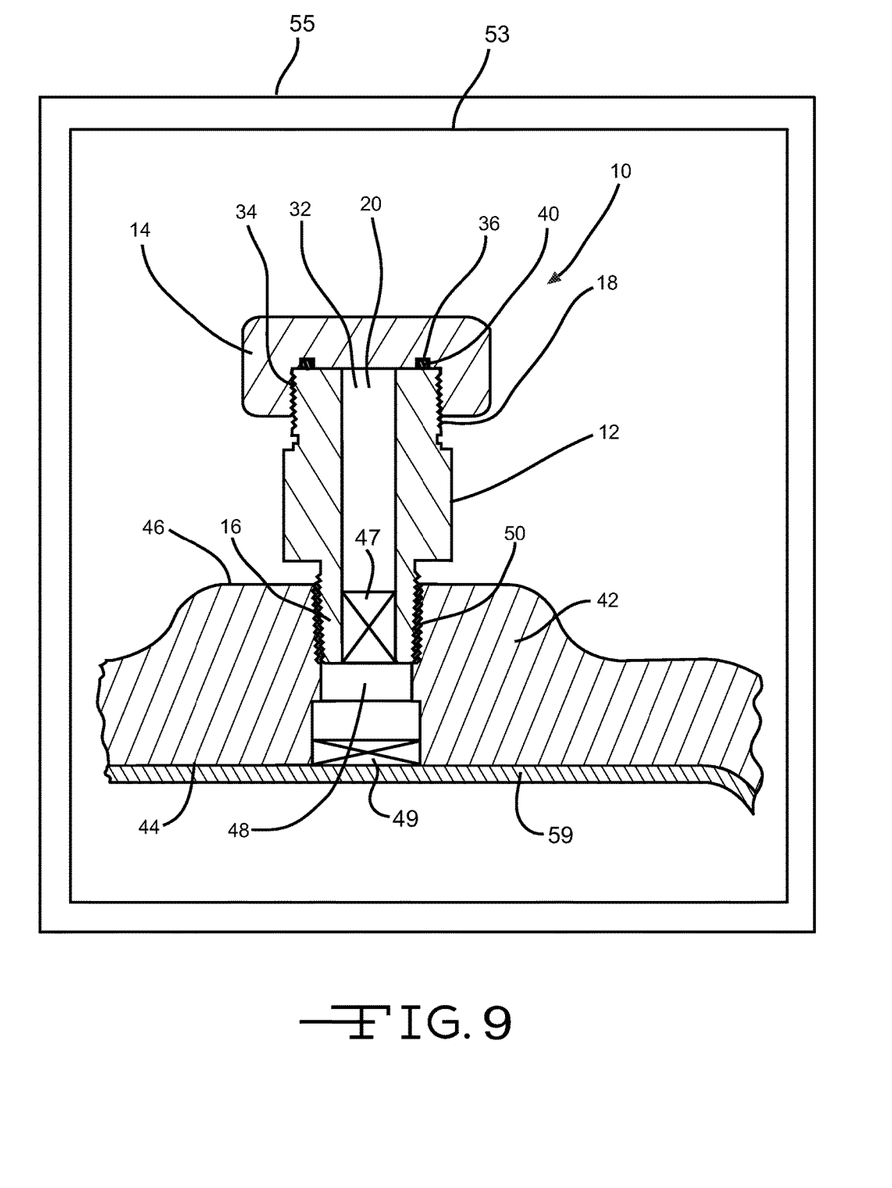
FIG. 9 is an illustration of the view of FIG. 8 with the composite having been removed from the tool, the cap having been hermetically resealed to the body, another composite having been laid up against the tool, and the another composite and tool having been placed in the vacuum bag and the heating device to cure the another composite.

FIG. 9 shows the view of FIG. 8 with the composite 51 having been removed from the tool 42 after the hole 57 was drilled, the cap 14 having been hermetically resealed to the second end 18 of the body 12, another composite 59 having been laid up against the first outer mold-line surface 44 of the tool 42, and the another composite 59 and tool 42 having been placed in the vacuum bag 53 and the heating device 55 to cure the another composite 59 by applying heat and pressure. During this additional process, the first and second ends 16 and 18 of the body 12 will remain hermetically sealed to the respective inner surface 50 of the hole 48 of the tool 42 and to the cap 14 in order to prevent contaminants from entering the hole 48 of the tool 42 and to provide consistent vacuum pressure while drawing the another composite 59 against the tool 42.

Figure 10:
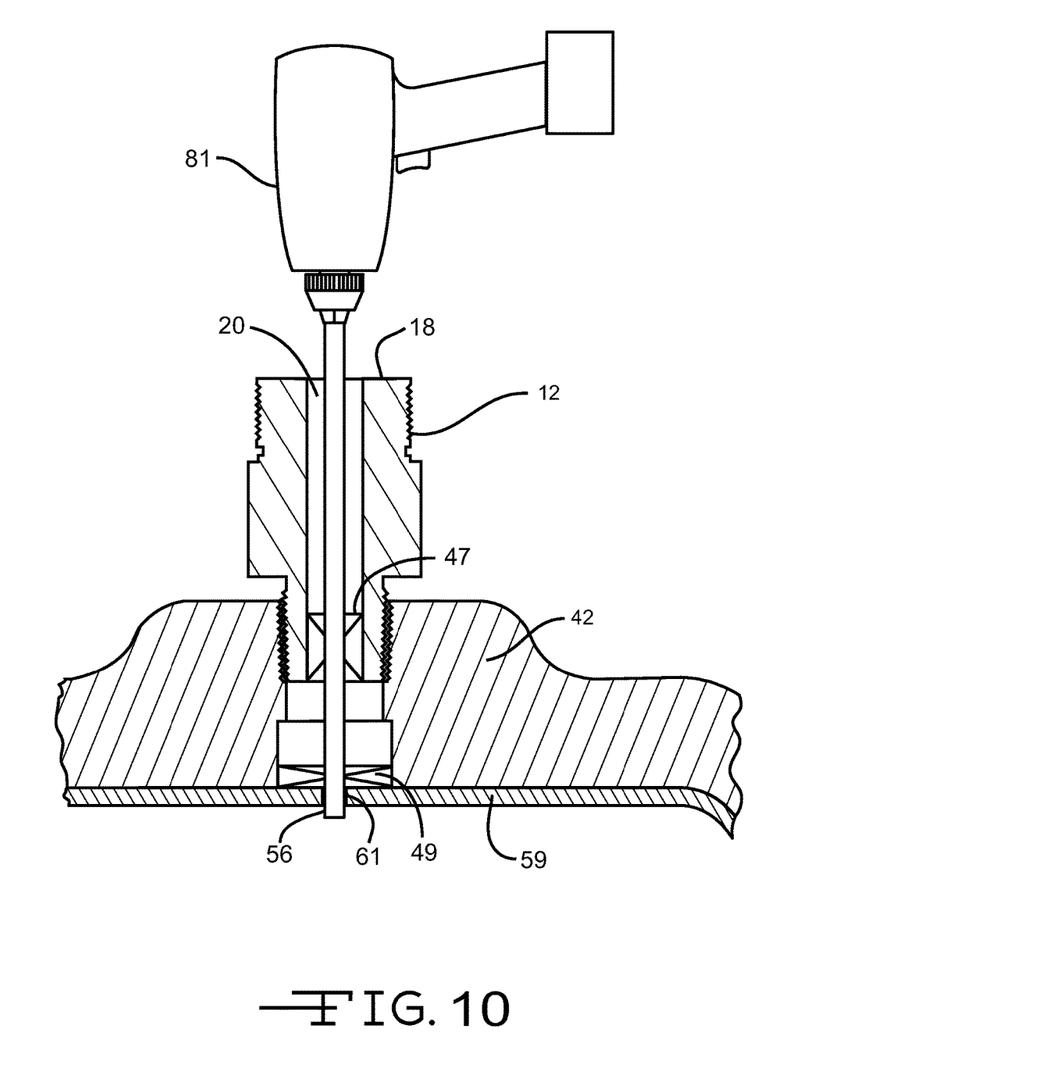
FIG. 10 is an illustration of the view of FIG. 9 with the tool and the another composite having been removed from the vacuum bag and heating device, the cap having been threadedly removed from the body, and the drill bit having drilled an additional hole in the another composite through the bore of the body.

FIG. 10 shows the view of FIG. 9 with the tool 42 and the another composite 59 having been removed from the vacuum bag 53 and heating device 55, the cap 14 having been threadedly removed from the second end 18 of the body 12, and the drill bit 56 having been used to drill an additional hole 61 in the another composite 59 through the bore 20 of the body 12. The bushing 47 may assist in keeping the drill bit 56 in the desired location. By repeating the steps of the process, additional holes may be drilled in additional composites.

Figure 11:
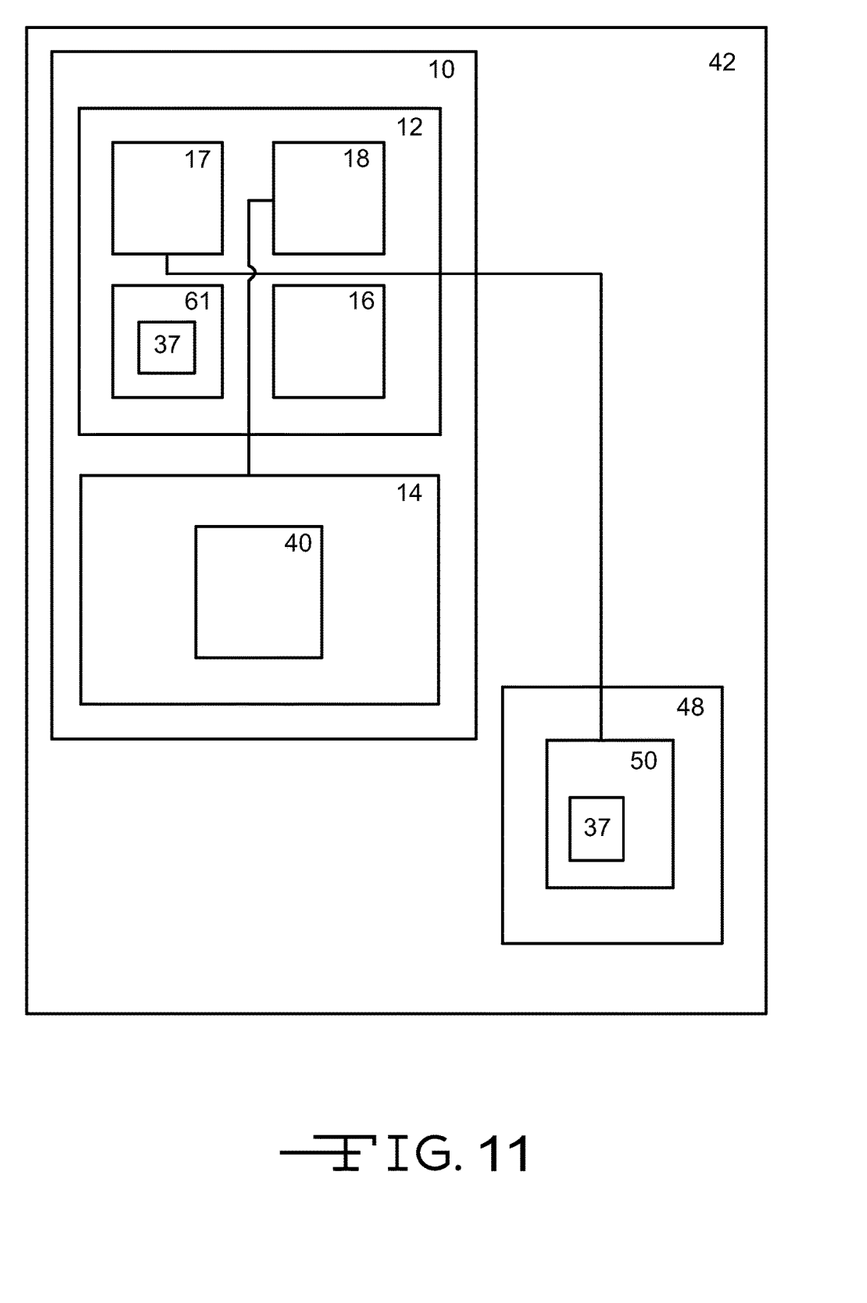
FIG. 11 is an illustration of a functional box diagram showing one embodiment of an apparatus attached to a tool.

FIG. 11 is an illustration of a functional box diagram 100 showing one embodiment of an apparatus 10 attached to a tool 42. As shown in FIG. 11, the apparatus 10 may comprise a body 12 and a cap 14. The body 12 may be one-piece. An outer surface 17 of a first end 16 of the body 12 may be threadedly attached and hermetically sealed to an inner surface 50 of a hole 48 of the tool 42 using sealing material 37 and National Pipe Thread tapered thread 61. A second end 18 of the body 12 may be threadedly attached and hermetically sealed to the cap 14 using an o-ring seal 40.

Figure 12:
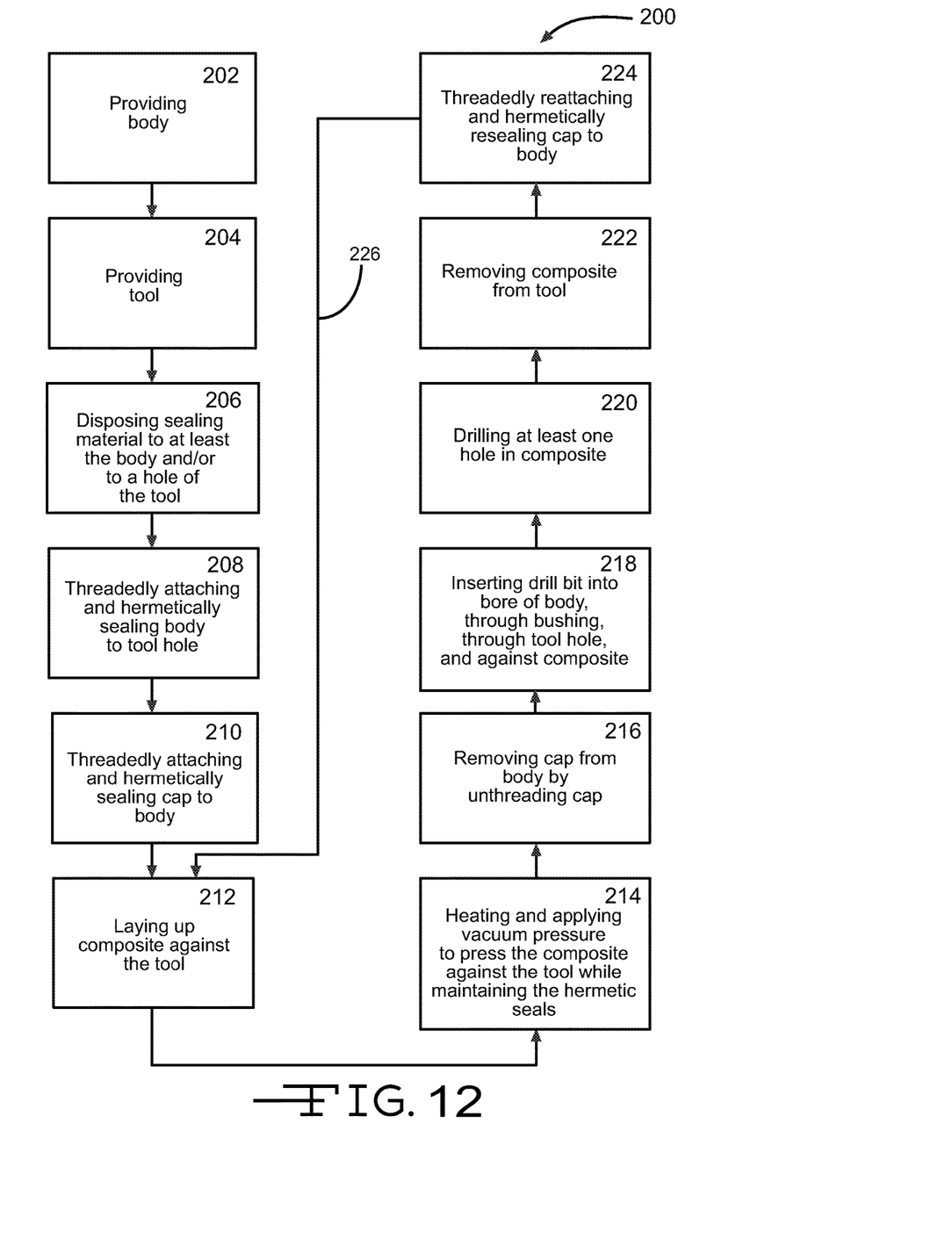
FIG. 12 is an illustration of a flowchart showing one embodiment of a method under the disclosure for drilling at least one hole in at least one composite.

FIG. 12 shows one embodiment of a method 200 under the disclosure for drilling at least one hole 57 and 61 in at least one composite 51 and 59. In step 202, a body 12 may be provided. The body 12 may be one-piece. The body 12 may comprise first and second ends 16 and 18 having threaded outer surfaces 17 and 19. A bore 20 may extend from the first end 16 through the second end 18. A ledge 22 may extend outwardly between the first and second ends 16 and 18. The ledge 22 may comprise a hexagonal shape. The male threaded outer surface 17 of the first end 16 may comprise a National Pipe Threaded tapered thread. The male threaded outer surface 19 of the second end 18 may comprise a United National Fine non-tapered thread.

In step 204, a tool 42 may be provided. The tool may comprise a first outer mold-line surface 44 for defining a shape of at least one composite 51 and 59, a second opposing surface 46, and a hole 48 extending from the first outer mold-line surface 44 through the second opposing surface 46.

In step 206, a sealing material 37, comprising at least one of a sealing compound and a sealing tape, may be disposed against at least one of the threaded outer surface 17 of the first end 16 of the body 12 and a female threaded inner surface 50 of the hole 48 of the tool 42.

In step 208, the male threads of the outer surface 17 of the first end 16 of the body 12 may be threadedly attached to the female threaded inner surface 50 of the hole 48 of the tool 42 so that the ledge 22 is at least one of disposed over and abutted against the second opposing surface 46. A rotating tool 27, such as a wedge, may be used to rotate the ledge 22 to threadedly rotate and attach the first end 16 of the body 12 to the inner surface 50 of the hole 48 of the tool 42. The first end 16 of the body 12 may be hermetically sealed to the inner surface 50 of the hole 48 of the tool 42.

In step 210, a female threaded inner surface 34 of a cap 14 may be threadedly attached to the male threaded outer surface 19 of the second end 18 of the body 12. The cap 14 may be hermetically sealed to the second end 18 using at least one of a seal and an o-ring seal 40 being disposed in the cap 14.

In step 212, a composite 51 may be laid up against the first outer mold-line surface 44 of the tool 42. In step 214, the composite 51 may be heated using a heating device 55 and vacuum pressure may be applied using a vacuum bag 53 to press the composite 51 against the first outer mold-line surface 44 of the tool 42 while maintaining the hermetic seals between the cap 14 and the body 12 and between the body 12 and the tool 42. During step 214, the composite may be cured. The steps of laying up, heating, and curing the composite 51 against the first outer-mold-line surface 44 of the tool 42 is defined as consolidating the composite 51. In step 216, after the composite 51 has been fully cured, the vacuum bag 53 may be removed or cut (depending on whether or not the vacuum bag 53 is reusable) to allow access to the cap 14, and the cap 14 may then be removed from the second end 18 of the body 12 by unthreading the cap 14 from the second end 18. In step 218, a drill bit 56 may be inserted into the bore 20 of the body 12, through a bushing 47, through the hole 48 of the tool 42, and against the composite 51. The drill bit 56 may either enter the bore 20 of the body 12 through a cut in the vacuum bag 53 or, if the vacuum bag 53 has been completely removed, may directly enter the bore 20 of the body 12. In step 220, at least one hole 57 may be drilled in the composite 51. Typically, the hole 57 in the composite 51 is drilled after fully curing the composite 51 to ensure that the composite 51 is stabile. In step 222, the composite 51 may be removed from the first outer mold-line surface 44 of the tool 42. In step 224, the cap 14 may be threadedly reattached to the second end 18 of the body 12. The cap 14 may be hermetically resealed to the second end 18 as a result of the at least one seal and o-ring seal 40 disposed in the cap 14. In step 226, steps 212 through 224 of the method 200 may be repeated to drill additional holes 61 in other composites 59.

Figure 13:
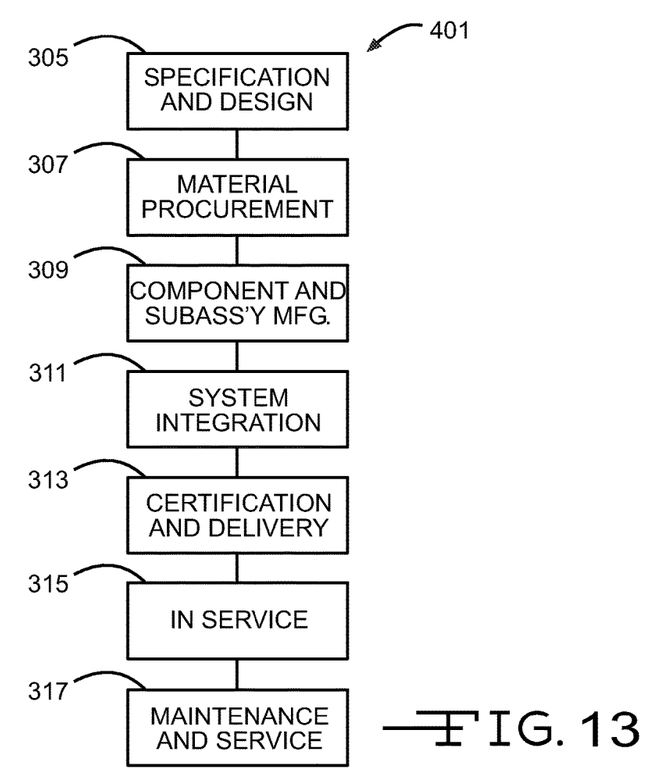
FIG. 13 is a flow diagram of aircraft production and service methodology.
Figure 14:
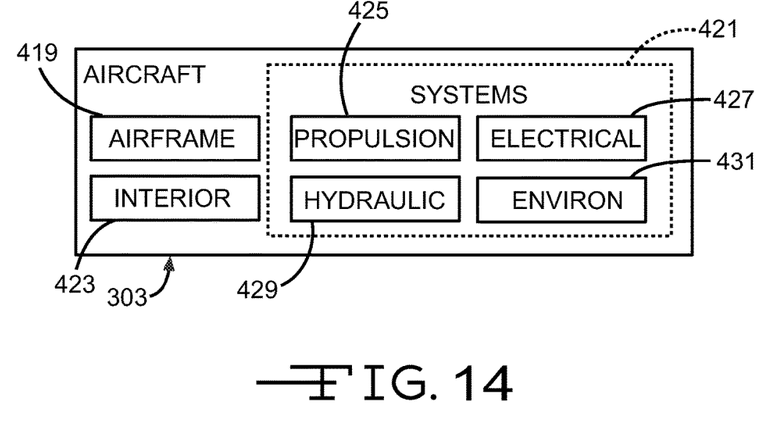
FIG. 14 is a block diagram of an aircraft.

Referring more particularly to the drawings, embodiments of the disclosure may be described in the context of an aircraft manufacturing and service method 301 as shown in FIG. 13 and an aircraft 303 as shown in FIG. 14. During pre-production, exemplary method 301 may include specification and design 305 of the aircraft 303 and material procurement 307. During production, component and subassembly manufacturing 309 and system integration 311 of the aircraft 303 takes place. Thereafter, the aircraft 303 may go through certification and delivery 313 in order to be placed in service 315. While in service by a customer, the aircraft is scheduled for routine maintenance and service 317 (which may also include modification, reconfigurations, refurbishment, and so on).

Each of the processes of method 301 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 13, the aircraft 303 produced by exemplary method 301 may include an airframe 419 with a plurality of systems 421 and an interior 423. The aircraft 303 may utilize the apparatus 10 and tool 42 of FIGS. 1-11 in order to manufacture composites 51 and 59 as disclosed herein. Examples of high-level systems 421 include one or more of a propulsion system 425, an electrical system 427, a hydraulic system 429, and an environmental system 431. Any number of other systems may be included. Although an aerospace example is shown, the principles of the invention may be applied to other industries, such as the automotive industry.

Apparatus and methods embodied herein may be employed during any one or more of the stages of the production and service method 301. For example, components or subassemblies corresponding to production process 309 may be fabricated or manufactured in a manner similar to components or subassemblies produced while the aircraft 303 is in service. Also, one or more apparatus embodiments, method embodiments, or a combination thereof may be utilized during the production stages 309 and 311, for example, by substantially expediting assembly of or reducing the cost of an aircraft 303. Similarly, one or more of apparatus embodiments, method embodiments, or a combination thereof may be utilized while the aircraft 303 is in service, for example and without limitation, to maintenance and service 317.

One or more embodiments of the disclosure may make it easier to locate and/or drill holes in one or more composite parts, may prevent contaminants from interfering with the manufacturing process, may reduce cost, may improve accuracy, may improve efficiency, may reduce required equipment, may increase repeatability, may reduce time of manufacture, and/or may reduce breakdown in equipment. In such manner, the present disclosure may be used to manufacture composite parts in both airplane and non-airplane applications.

It should be understood, of course, that the foregoing relates to exemplary embodiments of the disclosure and that modifications may be made without departing from the spirit and scope of the disclosure as set forth in the following claims.

I claim:

1. An apparatus for assisting in drilling holes, comprising:
    a body comprising:
        first and second ends, each having a threaded outer surface;
        a bore extending from the first end through the second end; and
        a ledge integral with and extending outwardly between the first and the second ends, the ledge comprising a hexagonal shape;
    a sealing member disposed against the threaded outer surface of the first end of the body; and
    a cap, having a top with a closed outer surface, threadedly attached to the second end of the body and sealing the bore at the second end.

2. The apparatus of claim 1 wherein the sealing member comprises a sealing compound or a sealing tape.

3. The apparatus of claim 1 wherein the threaded outer surface of the first end of the body comprises a National Pipe Thread tapered thread.

4. The apparatus of claim 1 wherein the threaded outer surface of the second end of the body comprises a United National Fine non-tapered thread.

5. The apparatus of claim 1 further comprising a seal or an a-ring disposed in the cap sealing the cap to the second end of the body.

6. The apparatus of claim 1 further comprising a bushing disposed in the bore of the body.

7. The apparatus of claim 1 wherein the sealing member is hermetically sealed to the first end of the body.

8. The apparatus of claim 1 wherein the cap is hermetically sealed to the second end of the body.

9. The apparatus of claim 1 wherein the cap also has a groove, formed on an inner surface of the cap.

10. The apparatus of claim 9 further comprising a seal, disposed in the groove, formed on the inner surface of the cap.

11. An assembly for assisting in drilling holes, comprising:
    a body comprising:
        first and second ends, each having a threaded outer surface;
        a bore extending from the first end through the second end; and
        a ledge integral with and extending outwardly between the first and the second ends, the ledge comprising a hexagonal shape;
    a tool comprising a first outer mold-line surface for defining a shape of a composite, a second opposing surface, and a hole extending from the first outer mold-line surface through the second opposing surface, wherein the first end of the body is threadedly attached, at the second opposing surface, to an inner surface of the hole of the tool;
    a sealing member sealing the threaded outer surface of the first end of the body to the inner surface of the hole; and
    a cap threadedly attached to the second end of the body and sealing the bore at the second end.

12. The assembly of claim 11 further comprising the composite, wherein the composite is disposed against the first outer mold-line surface of the tool.

13. The assembly of claim 11 wherein the sealing member comprises a sealing compound or a sealing tape.

14. The assembly of claim 11 wherein the threaded outer surface of the first end of the body comprises a National Pipe Thread tapered thread.

15. The assembly of claim 11 wherein the threaded outer surface of the second end of the body comprises a United National Fine non-tapered thread.

16. The assembly of claim 11 further comprising a seal or an a-ring disposed in the cap sealing the cap to the second end of the body.

17. The assembly of claim 11 further comprising a bushing disposed in the bore of the body or disposed in the hole of the tool.

18. The assembly of claim 11 wherein the sealing member hermetically seals the first end of the body to the inner surface of the hole of the tool.

19. The assembly of claim 11 wherein the cap is hermetically sealed to the second end of the body.

20. An apparatus for assisting in drilling holes, comprising:
   a body comprising:
      first and second ends, each having a threaded outer surface;
      a bore extending from the first end through the second end; and
      a ledge integral with and extending outwardly between the first and the second ends, the ledge comprising a hexagonal shape;
   a sealing member disposed against the threaded outer surface of the first end of the body and hermetically sealed thereagainst; and
   a cap having a threaded inner surface and threadedly attached to the threaded outer surface of the second end of the body and hermetically sealed thereagainst, the cap having a top with a closed outer surface, the top including a groove formed on an inner surface thereof and supporting a seal therein, the top sealing the bore at the second end.

* * * * *

UNITED STATES PATENT AND TRADEMARK OFFICE
CERTIFICATE OF CORRECTION

PATENT NO. : 10,016,819 B2
APPLICATION NO. : 14/260675
DATED : July 10, 2018
INVENTOR(S) : John E. McCracken Page 1 of 1

It is certified that error appears in the above-identified patent and that said Letters Patent is hereby corrected as shown below:

In the Claims

In Column 10, Line 20, in Claim 5, delete "a-ring" and insert -- o-ring --, therefor.

In Column 10, Line 66, in Claim 16, delete "a-ring" and insert -- o-ring --, therefor.

Signed and Sealed this
Second Day of October, 2018

Andrei Iancu
*Director of the United States Patent and Trademark Office*